US008606708B1

(12) United States Patent
Homier et al.

(10) Patent No.: US 8,606,708 B1
(45) Date of Patent: Dec. 10, 2013

(54) METHODS AND SYSTEMS FOR INTEGRATED AND AUTOMATED FINANCIAL SERVICES

(75) Inventors: Matthew J. Homier, San Francisco, CA (US); Craig A. Heath, Paradise, CA (US); Thomas E. Hurlbutt, Mountain View, CA (US); Jose M. Resendiz, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 319 days.

(21) Appl. No.: 12/771,899

(22) Filed: Apr. 30, 2010

(51) Int. Cl.
*G06Q 40/00* (2012.01)

(52) U.S. Cl.
USPC .............................................. 705/40; 705/35

(58) Field of Classification Search
USPC ........................................................... 705/35
See application file for complete search history.

(56) References Cited

U.S. PATENT DOCUMENTS

| | | | |
|---|---|---|---|
| 5,903,881 A * | 5/1999 | Schrader et al. ................. 705/42 |
| 7,756,767 B2 | 7/2010 | Cluse et al. |
| 7,769,649 B1 | 8/2010 | Eliscu |
| 7,792,748 B1 | 9/2010 | Ebersole et al. |
| 7,890,405 B1 | 2/2011 | Robb |
| 7,895,102 B1 | 2/2011 | Wilks et al. |
| 7,958,049 B2 | 6/2011 | Jamison et al. |
| 8,099,349 B1 | 1/2012 | Johnson |
| 2002/0198807 A1 | 12/2002 | Kobayashi et al. |
| 2003/0055783 A1 * | 3/2003 | Cataline et al. ................. 705/40 |
| 2003/0191711 A1 * | 10/2003 | Jamison et al. ................. 705/40 |
| 2004/0039674 A1 | 2/2004 | Coloma |
| 2004/0143546 A1 | 7/2004 | Wood et al. |
| 2005/0211765 A1 * | 9/2005 | Brown et al. ................. 235/379 |
| 2005/0289037 A1 | 12/2005 | Smith et al. |
| 2006/0074788 A1 | 4/2006 | Grizack et al. |
| 2008/0046349 A1 | 2/2008 | Elberg et al. |
| 2008/0275816 A1 | 11/2008 | Hazelhurst |
| 2008/0319885 A1 | 12/2008 | D'Anna et al. |
| 2009/0319437 A1 | 12/2009 | Stanley |
| 2010/0145851 A1 * | 6/2010 | Van Rensburg et al. ........ 705/42 |
| 2011/0282734 A1 | 11/2011 | Zurada |

OTHER PUBLICATIONS

Office Action dated Feb. 24, 2012, Amendment dated May 17, 2012 and Final Office Action dated Jul. 27, 2012 in U.S. Appl. No. 12/769,543, filed Apr. 28, 2010, (60 pages).
Office Action dated Apr. 9, 2012, Amendment dated Aug. 9, 2012 and Final Office Action dated Oct. 19, 2012 in U.S. Appl. No. 13/031,049, filed Feb. 18, 2011, (62 pages).

* cited by examiner

*Primary Examiner* — William Rankins
(74) *Attorney, Agent, or Firm* — Vista IP Law Group LLP

(57) ABSTRACT

Systems, methods and articles of manufacture for a computerize method of providing financial management to a user by integrating financial data from a plurality of sources such as online financial services. The system analyzes the financial data from a plurality of sources together to determine financial transactions beneficial to the user, and executes the financial transactions. The system may also analyze a user's transactional history among multiple accounts to identify and predict recommended financial transactions to the user. This provides an integrated solution for linking and coordinating multiple online banking services which previously had no operational link.

9 Claims, 3 Drawing Sheets

METHODS AND SYSTEMS FOR INTEGRATED AND AUTOMATED FINANCIAL SERVICES

BACKGROUND

The invention relates to computerized and online financial services; and more particularly, to new methods and systems for integrated and automated computerized financial services.

Most financial institutions, such as banks, investments companies, stock brokers, credit card issuers, and insurance companies, offer online services to their customers/clients (collectively referred to as clients or users) which are accessible by the user through a website of provided by the financial institution. The online services range from basic non-transactional features such as reviewing transactions, account balance and statement information, to transactional features such as account to account fund transfers, wire transfers, loan applications, new account applications, bill payment and investment purchase and sale. The online services provided by each financial institution vary from institution to institution.

These online services provide a significant convenience to the user, and are designed to be fairly easy to use. For example, online bill pay systems allow a user to pay bills from various payees through the website provided by the financial institution (or a third party website service provider contracted by the financial institution). These online bill payment systems are sometimes called an online bill payment application or an online bill payment solution. The online bill pay systems allow a user to view, review, and/or make payments and pay bills to various payees from the user's financial account at the financial institution.

The user simply navigates to the online bill payment website using a web browser on a web enabled device, such as a personal computer, or even a cell phone, connected to the internet. Generally, the user sets up a list of payees in the online bill payment application and then can enter payment instructions for each payee that the user desires to make a payment. The user creates the user's list of payees by selecting the payees from a list of available payees provided by the online bill payment application. The application may also allow the user to search for payees using search terms, alphabetized groups, categorized groups, or the like. The user can make individual payments or can set up recurring payments to a payee, such as a specified amount every month or other periodic payment.

Some online bill payment applications have the capability to receive electronic bills (also referred to as e-bills), in which case the user can use the online bill payment application to view the bill, and then make a desired payment. If the user receives e-bills on the bill payment system for a payee, the user may be able to set up automatic recurring payments in which the bill payment system may make a payment to the payee for the full outstanding balance, the minimum required payment, or another amount specified by the user. In this way, once the user sets up the payment preferences for a payee, the bill payment application can make payments to the payee without any further action by the user.

Another useful tool for managing personal finances is a personal financial management software application. Personal finance software applications (including online applications) have become very popular and allow a user to organize and track their personal finances. As examples, Quicken® is a desktop and online personal finance software application, available from Intuit Inc., Mountain View, Calif., and Mint® is an online application (See the website "mint.com"). An example of an online personal financial management system provided as an online banking service is FinanceWorks™ provided by Intuit Financial Services, a unit of Intuit Inc., of Mountain View, Calif. FinanceWorks™ allows a user to download financial data from numerous financial institutions from a single website, and then analyzes and organizes the data and provides the financial management functions described above for personal finance applications. Such personal finance applications can perform financial management functions such as managing and paying bills, tracking and managing investments, performing budgeting tasks, viewing and printing summaries and reports, preparing and printing expense reports, writing checks, paying bills with checks or online The applications can download banking, financial and billing data directly from banks, companies, and financial institutions through a secure internet connection. The applications can create a financial profile of the user in which users can review their financial "picture," review spending and saving habits, create budgets and spending and saving goals, calculate gains and losses on investments, and have reminders set to emphasize dates on which bills or other obligations are to be paid.

More sophisticated applications can also manage small business income and expenses, and investment properties. Some applications can also compare a user's bank accounts, credit cards, brokerage accounts, and even other service and utility accounts like cellular phone service, cable/satellite TV, gas and electric, with competing accounts to determine if there are more cost effective options.

Personal finance applications may also provide tax planning information and prepare the personal financial data for transfer into a tax preparation software application.

Some financial institutions' online services even include a personal financial management application. However, while financial institution online services and personal finance applications have provided much convenience for users and may even be provided at the same website, the various online services such as bill payment, account review and personal financial management applications have no real connection between them. The burden is left to the user to coordinate these services on their own. With each action the user takes in on service, there are usually complementary actions for the user to take within the other systems.

For example, consider a customer that needs to pay a large bill, but their payment account does not have enough money to cover the expense, although they have sufficient funds in their savings account. The onus is on the user to check the balances of their accounts, transfer funds, and make the payment. As another example, suppose a user's primary spending account balance is getting low. If the user continues their current spending rate, they overdraw before their next paycheck. The onus again is on the user to detect this sit don and take corrective action. As one more illustration, a customer has a high interest savings account at their financial institution, but their primary spending account is at another institution. The user wants to maximize their eturns by keeping only what is necessary to cover spending in the primary spending account and to keep the rest in the high interest savings. The onus is on the customer to determine when and how much the move between accounts, and to initiate the transfers herself.

SUMMARY

One embodiment of the present invention is directed to a method of providing financial management of one or more financial accounts to a user utilizing an integrated financial services system (IFSS) which links multiple online services to predict and identify financial transactions beneficial to the user. The IFSS may then make recommendations to the user, receive instructions from the user, and even take action to implement the financial transactions, all with little or no action by the user. The IFSS is a system comprising one or more computers and/or servers having a software application which is programmed to perform the steps of the method. The IFSS may be in communication with financial institutions and users through a network, such as any private network or the internet, in order to communicate and access data. Indeed, the IFSS may be integrated as part of an online services solution of a financial institution which has various other online services, such as bill payment and financial management tools.

In one embodiment, the method of providing financial management to a user utilizing an integrated financial services system (IFSS), comprises the IFSS accessing first financial data regarding a first financial account of the user at first financial institution. In general, financial data may include any data related to financial accounts, financial transactions, and the finances of the user, such as bill payments, account balances, deposits, checks, withdrawals, budget data, spending data, income data, investment data, etc. The IFSS also accesses at least one of (i) second financial data comprising financial data of the user as prepared by a personal financial management application, or (ii) third financial data comprising financial data regarding a second financial account of the user, or (iii) fourth financial data comprising scheduled transactions of the user in an online banking system. The IFSS may access the various financial data by any suitable method, such as accessing the data from the user's computer (e.g. the personal finance management application), from the servers and/or databases of financial institutions, through a communication network or by electronically downloading the data into the IFSS (such as by a tape drive, or other data storage media).

The IFSS analyzes the first financial data together with at least one of the second financial data, third financial data and fourth financial data. As an example, the IFSS may assess the user's account balances and scheduled bill payments to determine if there is a potential overdraft problem. The IFSS determines a first financial transaction for the user regarding the first financial account based on the step of analyzing. For instance, if the IFSS analyzes that there is a potential overdraft problem with the user's checking account, the IFSS may determine a first financial transaction which is a funds transfer from the user's savings account to the user's checking account.

In a further aspect of the present invention, the IFSS may automatically execute the first financial transaction. Alternatively, it may provide the determined financial transaction as a recommendation to the user. The IFSS would then receive instructions from the user whether to execute the first financial act.

In another embodiment of the present invention, a method of providing financial management to a user utilizing an integrated financial services system (IFSS), a user's history of financial transactions matched to particular financial conditions are analyzed to identify and predict beneficial financial transactions and to independently take action or propose the action to the user for approval. Accordingly, the method comprises the IFSS accessing financial data from a plurality of the user's financial accounts. The financial accounts can be at the same or different financial institutions. The IFSS analyzes the financial data to identify financial transactions executed by the user and the conditions of the user's financial accounts when the user executed the financial transactions. The IFSS identifies when the user's financial accounts substantially match the first set of conditions of the user's financial accounts. Finally, the IFSS sends instructions to execute the first financial transaction. The first financial transaction may comprise a single financial transaction or a set of financial transactions.

In one aspect of the method, the IFSS may send the instructions automatically without input from the user. In another aspect, the IFSS may first provide a recommendation to the user regarding the first financial transaction to the user, and then receive instructions from the user before executing the first financial transaction.

Another embodiment of the present invention is directed to a system for implementing the above-described methods of providing financial management to a user utilizing an integrated financial services system. As described above, the system comprises one or more computer servers, and/or other computers which are configured to access financial data of the user related to the user's online banking services, which may include data from other financial institutions or a personal financial management application. The system may be in communication with financial institutions and users through a network, such as any private network or the internet, in order to communicate and access data. The system may be separate from any other online banking services solution, or it may be integrated as part of an online services solution of a financial institution which has various other online services, such as bill payment and financial management services.

The computer(s) of the system are configured to access the financial data of the user related to the user's online banking services, and to perform the steps of at least one of the method embodiments of providing financial management to a user, including a method comprising the steps of: (a) accessing first financial data regarding a first financial account of the user at a first financial institution; (b) accessing at least one of (i) second financial data comprising financial data of the user as prepared by a personal financial management application, or (ii) third financial data comprising financial data regarding a second financial account of the user, or (iii) fourth financial data comprising scheduled transactions of the user in an online banking system; (c) analyzing the first financial data together with at least one of the second financial data, third financial data and fourth financial data; and (d) determining a first financial transaction for the user regarding the first financial account based on the step of analyzing.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Figure 1:
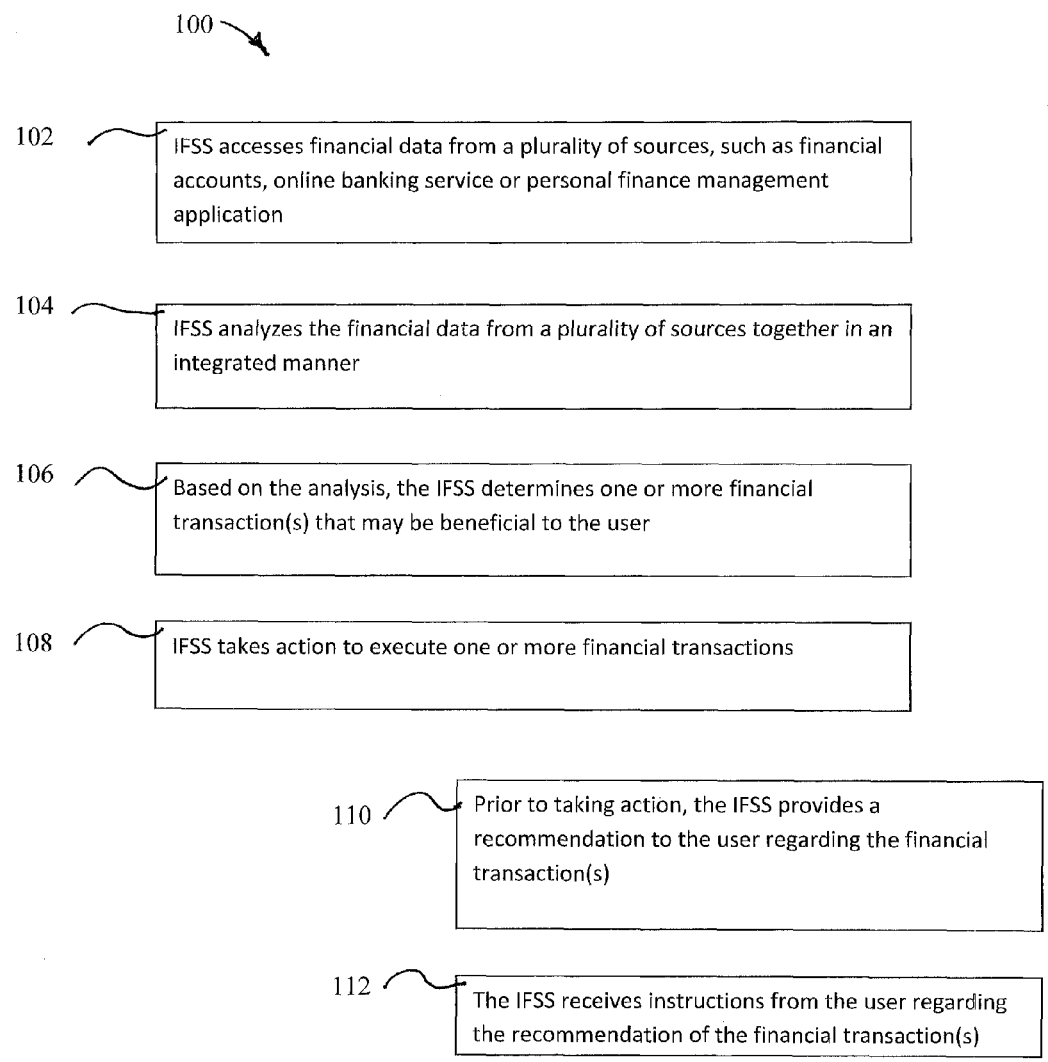
FIG. 1 is a flow chart of a method of providing financial management to a user according to one embodiment of the present invention.

Embodiments of the present invention are directed to methods and systems for providing computer-implemented financial management to a user by linking and coordinating multiple online banking services. Referring to FIG. 1, in one embodiment, a method 100 for providing computer-implemented financial management is shown.

As described in more detail below, the method 100 will typically be implemented on an integrated financial services system (IFSS). The IFSS may comprises one or more computers, computer servers, website servers, and/or other computers networked together, or alternatively may be a single computer, such as a user's home or office computer. While the exemplary embodiments described herein are directed to a networked server system provided by a financial institution, in which the IFSS is operably connected through a network to the servers of other financial institutions, it should be understood that the methods and system may also be implemented on a user's computer. Accordingly, the software program may be a desktop application that resides on the computer operated by the user, such that the user computer is the IFSS. Furthermore, the software program may be a stand-alone application, or it may be integrated into another software program. For instance, the software program may be integrated into a personal finance application such as FinanceWorks™ provided by Intuit Financial Services, a unit of Intuit Inc., of Mountain View, Calif., Quicken®, available from Intuit Inc., Mountain View, Calif., or Mint®, an online application available at the website MINT.COM. Also, the IFSS may be integrated with an online services solution of a financial institution which has various other online services, such as bill payment and financial management services.

The method 100 comprises step 102 in which the IFSS monitors the user's financial accounts and financial status related to a plurality of online services of one or more financial institutions. In order to monitor the financial accounts and financial status, at step 102 the IFSS accesses financial data from a plurality of sources, such as financial institutions, online banking services and personal financial management applications.

For example, step 102 could include obtaining financial data from a first source comprising a checking account balance from the user's checking account at a first bank. In general, financial data may include any data related to financial accounts, financial transactions, and the finances of the user, such as bill payments, account balances, deposits, checks, withdrawals, budget data, spending data, income data, investment data, and the like.

To monitor and integrate multiple online financial services, at step 102, the IFSS also accesses financial data from at least one other source of financial data different from the first source. For example, at step 102, the IFSS may access scheduled transactions from an online banking system used by the user, such as bill payment data from the user's bill payment service at the first bank or even a different second bank. As further examples of another source of financial data, the IFSS may access data from a savings account, or an investment account, or a personal financial management application (e.g. Quicken®, FinanceWorks™, or Mint®).

The IFSS may access even more financial data of the user from additional sources. For example, the IFSS may access data from any combination or all of the sources of financial data described herein.

The IFSS may access the financial data from a plurality of sources from any suitable source and by any suitable means, including without limitation, accessing the data from the servers and/or databases of financial institutions, from the user's computer, from an online or desktop personal finance management application, from an online financial service, or even from the databases of a financial institution which provides the IFSS. As examples, the IFSS can access the financial data through a communication network, such as a private network and/or the internet, or by electronically downloading the data into the IFSS, such as by a tape drive, or other electronic data storage media.

Typically, the IFSS will periodically be accessing the financial data from a plurality of sources in case the financial data for the user should change. The IFSS may store the financial data in a database, or it may access the financial data each time the method 100 is performed. It is understood that the financial data will at least be temporarily stored by the IFSS when performing the method 100, and therefore "storing the financial data" refers to storing the data even when the system is not performing the method 100. Storing the financial data may have the benefit of increasing the speed at which the IFSS can perform the method 100, because it does not have to access the financial data each time. However, for security reasons, the operator of the IFSS may not want to store the financial data.

At step 104, the IFSS analyzes the financial data from a plurality of sources together in an integrated manner. In other words, the IFSS performs an analysis which takes into account both first financial data from a first source and second financial data from a second source, and so on for the number of sources required for the particular analysis. Continuing the example above, if the first financial data is a checking account balance and the second financial data is bill payment data, step 104 may analyze these data together to determine whether the checking account has sufficient funds to make the payments scheduled or expected to be paid by the bill payment system.

At step 106, the IFSS determines one or more financial transactions that may be beneficial to the user based on the analysis at step 104. Going back to the example above, if the IFSS analyzes that the scheduled bill payments will exceed the checking account balance, the IFSS may determine a financial transaction comprising a funds transfer from the user's savings account to the checking account. The IFSS may determine that multiple transactions are necessary. As an example, assume that the user has a savings account and an investment account, and that the IFSS has accessed financial data from both accounts at step 102. Also assume that financial data indicates that the balance of the savings account is insufficient to cover the amount that the scheduled bill payments will exceed the checking account balance. Then, the IFSS may determine two transactions, a transfer from the savings account to the checking account, and a transfer from the investment account to the savings account. Many variations are possible within the scope of the present invention. For instance, the IFSS may determine to make the two transfers to the checking account, and also change one of the scheduled payment to either delay the payment or change the payment amount (e.g. change the payment from payment in full to a minimum required payment).

At step 108, the IFSS takes action to execute the one or more financial transactions determined by the IFSS at step 106. The IFSS executes the financial transaction(s), such as transferring funds from a checking account to a savings account. The IFSS may execute the financial transactions by performing the transaction itself. If the IFSS is provided by the first bank, for instance, the IFSS may be able to perform the transaction itself. The IFSS may also be executed the IFFS sending instructions to the financial institutions involved in the financial transactions. In addition, the IFSS may obtain the credentials of the user (e.g. username and password) and execute the transactions through an online account of the user for an online financial service.

The IFSS may execute the financial transactions at step 108 automatically, independent of any action by the user. Alternatively, at step 110, prior to executing the financial transactions, the IFSS may provide a recommendation to the user regarding the financial transactions determined at step 108. The IFSS may provide the recommendation via email, text message (e.g. sms), an alert on an online banking service website, an automated telephone call, or other suitable method. Then, at step 112, the IFSS receives instructions from the user regarding the recommended financial transaction. The user may send instructions to the IFSS to: (i) execute the transaction; (ii) modify the transaction(s) and then execute the modified transaction(s); (iii) consider the transaction at a later time; or (iv) reject the recommendation and not execute the transaction(s). The user can send the instructions to the IFSS by email, text message (e.g. sms), telephone call, or via an online banking service website, or other suitable method. At step 110, the IFSS may provide one or more of these options to the user in the recommendation.

Several examples of the method 100 will now be provided. In the first example, a user has a large bill scheduled for payment in a bill payment system, but the checking account the user uses to pay such bills does not have sufficient funds to pay the bill. However, the user has sufficient funds in a savings account to cover the shortfall in the savings account. The IFSS will access the financial data in the checking account, savings account, and bill payment system, including the balances of the checking account and savings account and the scheduled payment of the large bill. The IFSS will analyze this financial data and determine that the large bill will overdraft the checking account, and that the savings account has sufficient funds to cover the shortfall. The IFSS will determine a financial transaction comprising a transfer for funds from the savings account to the checking account in the amount of the shortfall. The IFSS may execute the transfer. Alternatively, the IFSS may send a recommendation to the user, advising that the large bill will overdraft the checking account, and recommending that the user transfer funds from the savings account to the checking account. The user may then send instructions to the IFSS to execute the funds transfer.

In another example, a user's primary spending account balance is getting low. The IFSS accesses financial data from the user's primary spending account and savings account, and the user's spending history and the user's expected direct deposit payroll from a personal financial management application or from the user's financial transaction history. The IFSS analyzes this financial data and determines that the user will likely overdraw the spending account before the next payroll deposit. The IFSS determines a financial transaction to transfer for funds from the savings account to the checking account in the amount of the shortfall. The IFSS may execute the transfer. Alternatively, the IFSS may send a recommendation to the user, advising that the anticipated spending will overdraft the checking account, and recommending that the user transfer funds from the savings account to the checking account. The user may then send instructions to the IFSS to execute the funds transfer. In another aspect, the IFSS may simply send a warning to the user, advising the user of the low spending account balance, the user's typical spending rate, and a financial recommendation to decrease the user's spending rate. The IFSS can even recommend the appropriate spending rate, such as $100 per day.

In an additional example, a user has a high interest savings account at a first bank, and a primary spending account (such as a checking account) at a second bank that does not pay interest. The user desires to maximize their returns on the balances by keeping only enough funds in the spending account to cover expected spending, and keeping the rest in the high interest savings account. The IFSS accesses financial data from the user's primary spending account and savings account, and the user's expected spending and deposits from a personal financial management application or from the user's financial transaction history. The IFSS analyzes this financial data and determines the amount that the user needs to have in the spending account at a given time, for example, a particular day of the month. The IFSS also analyzes the financial data and determines how much the user has in the spending account. The IFSS then determines whether the spending account balance is too high or too low. If the balance is too high, the IFSS determines a financial transaction to transfer funds from the spending account to the high interest savings account in the amount that the spending account exceeds the required amount at the given time. If the spending account balance is too low, the IFSS determines a financial transaction to transfer funds from the savings account to the spending account in the required amount. The IFSS may automatically execute the transfer. Alternatively, the IFSS may send a recommendation to the user, advising of the recommended transfer. The user may then send instructions to the IFSS to execute the funds transfer.

Figure 2:
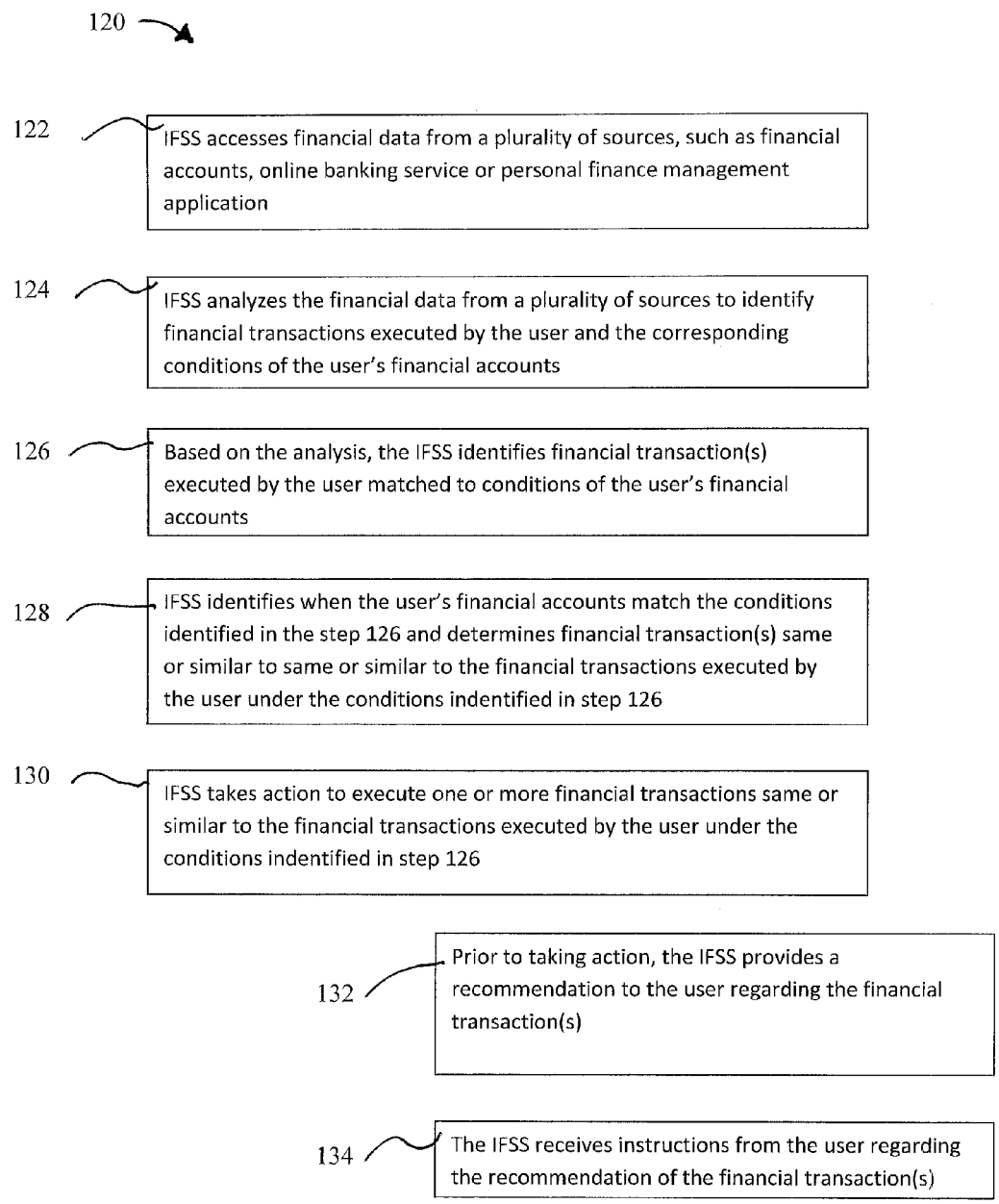
FIG. 2 is a flow chart of a method for providing financial management to a user according to additional embodiments of the present invention.

Turning to FIG. 2, another embodiment of a method 120 for providing computer implemented financial management is shown. The method 120 will typically be implemented on an IFSS very similar to the IFSS for method 100. The method 120 is very similar to the method 100, and in fact, has aspects that can be implemented with the method 100. The main difference is that method 120 also provides a type of "learning" so that the system can identify and predict common financial transaction workflows desired by the user. The IFSS has access to the financial data related to multiple online banking services of the user and with each action a user takes, the system can gain the ability to identify and predict common transaction workflows the user has taken under certain financial conditions. As a user uses various online banking services, the system identifies the transaction workflows the user takes and the financial data conditions in which the user made a particular transaction workflow. Then, the system can take action independently or can propose the action to the user and then act upon the user's instructions.

So, at step 122, the IFSS access financial data from a plurality of sources such as financial institutions, online banking services and personal financial management applications. Step 122 is basically the same as step 102 described above, and therefore, all of the description for step 102 applies equally to step 122.

At step 124, the IFSS analyzes the financial data from a plurality of sources to identify financial transactions executed by the user and the corresponding conditions of the user's financial accounts when the user executed the financial transactions. Related to this step, at the step 126, the IFSS identifies one or more financial transactions executed by the user and the corresponding conditions of the user's financial accounts. In other words, the IFSS is analyzing for patterns of financial transactions taken by the user when the user's financial accounts have a certain condition. For example, the IFSS may identify that in the past, the user has transferred funds from a savings account to a checking account when the checking account balance drops below an approximate amount more than a week before the user's monthly payroll is electronically deposited into the checking account. So the financial transaction is a fund transfer from a checking account to a savings account and the corresponding conditions of the user's financial accounts is that the checking account an approximate amount.

The IFSS may continue to perform steps 126 and 128 over time and adjust financial transactions and matched conditions based on the user's actions. In this way, the IFSS can "learn" over time, and can determine the appropriate financial transactions across various financial accounts and/or online financial services of the user.

At step 128, the IFSS identifies when the user's financial accounts substantially match a set of conditions identified in step 128.

At step 130, when the IFSS identifies that the user's financial accounts substantially match a set of conditions identified in step 126, the IFSS takes action to execute one or more financial transactions same or similar to the financial transactions identified in step 126. In the preceding example the IFSS would identify when the checking account balance drops below an approximate amount more than a week before the user's monthly payroll is electronically deposited into the checking account.

The aspect of executing the financial transaction(s) of step 130 is the same as for step 108 above. Similarly, the combination of steps 130, 132 and 134 is the same as steps 108, 100 and 112, above. Accordingly, the description for steps 108, 110 and 112 above, applies equally to steps 130, 132 and 134, respectively.

Furthermore, steps 126, 128 and 130 may be used in method 100 described above. Accordingly, method 100 may analyze the financial data as described for steps 104 and 106 to determine a financial transaction for the user, and may also analyze the data as provided by steps 126, 128 and 130 in method 120 to determine a financial transaction for the user.

Figure 3:
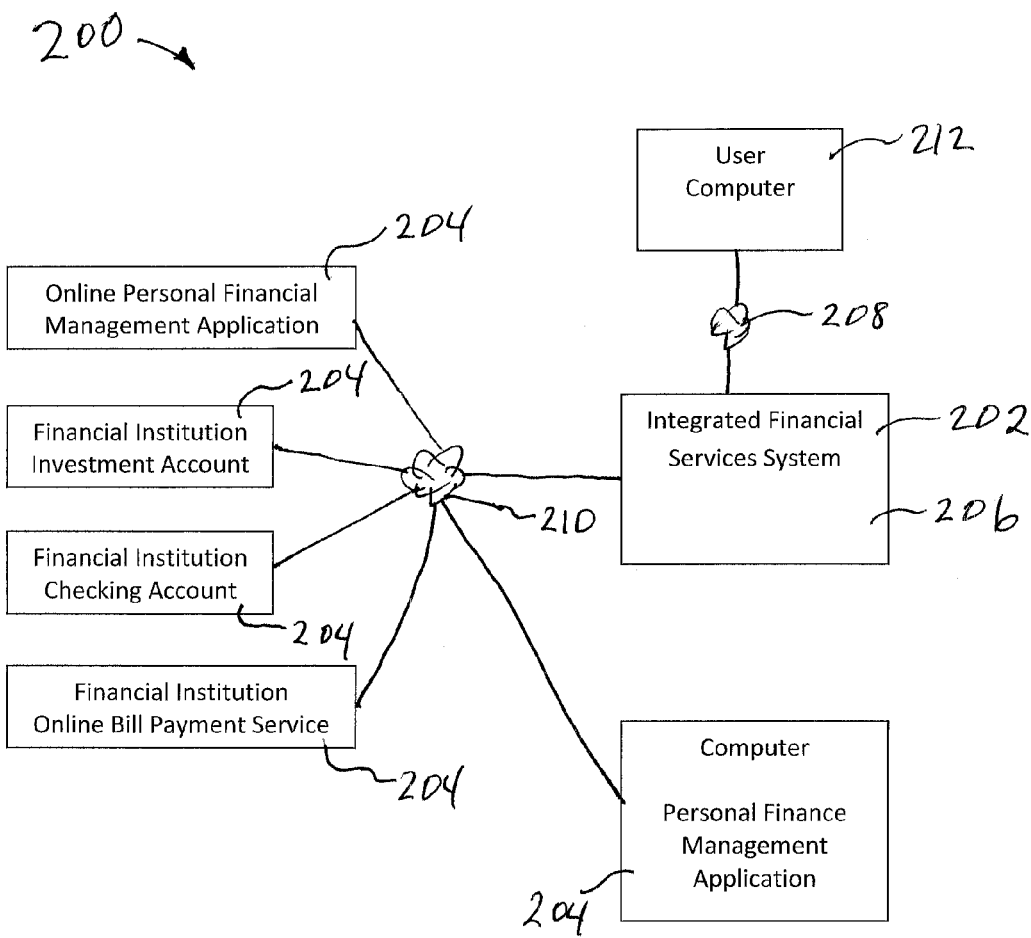
FIG. 3 illustrates an exemplary system for providing financial management to a user according to the methods of the present invention, according to another embodiment of the present invention.

Referring now to FIG. 3, a non-limiting example of a system 200 that may be used to implement any of the methods 100 and 120 as shown in FIGS. 1 and 2, as well as other method embodiments that may be described herein, is depicted. It should be understood that not all of the components of the system 200 are needed to implement the methods 100 and 120, and therefore, the system may include only those components necessary to perform the method embodiments as described herein.

The system 200 includes an Integrated Financial Services System (IFSS). The IFSS comprises one or more computers, and/or computer servers, which are configured to access financial data of the user related to the user's online banking services, which includes data from other financial institutions or a personal financial management application. The IFSS 202 is in communication with a plurality of financial institutions and sources of financial data 204 through one or more networks 210, such as any private network or the internet, in order to communicate and access data. The networks 210 may include a proprietary network, LAN, WAN, cellular network, wireless network, the internet and/or other suitable network.

The IFSS may also include a website server 206 which is in communication with the internet 208. The IFSS may have a website application which allows a user to access the IFSS to setup the IFSS 202, review financial transactions and recommendations, give instructions to the IFSS 202, and otherwise interact and use the IFSS 202. A user accesses and uses the IFSS 202 through a user computer 212, or other web enable device, connected to the internet 208.

The IFSS is configured and programmed to perform the steps of the methods 100 and 120, as well as any other method embodiments described herein.

As described herein, the IFSS 202 may be separate from any other online banking services solution, or it may be integrated as part of an online services solution of a financial institution which has various other online services, such as bill payment and financial management services.

Accordingly, system 200 is provided which can provide financial management to a user according to the methods 100 and 120, and any other methods described herein.

The methods 100 and 110, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the methods 100 and 120, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A method of providing financial management to a user utilizing an integrated financial services system (IFSS), comprising the following steps:
    accessing, by the IFSS, first financial data regarding a first financial account of the user at a first financial institution, wherein the first financial account is a deposit account which allows money to be deposited and withdrawn by the user;
    accessing, by the IFSS, each of second financial data comprising financial data of the user as prepared by a personal financial management application, third financial data comprising financial data regarding a second financial account of the user, and fourth financial data comprising scheduled transactions of the user in an online banking system;
    analyzing, by the IFSS, the first financial data together with at least one of the second financial data, the third financial data and the fourth financial data; and
    determining, by the IFSS, a first financial transaction for the user regarding the first financial account based on the step of analyzing, the first financial transaction comprising a transfer of funds into the first financial account from a different financial account.

2. The method of claim 1, further comprising the following steps:
    providing, by the IFSS, a recommendation to the user regarding the first financial transaction;
    receiving, by the IFSS, instructions from the user regarding the first financial transaction; and
    executing, by the IFSS, the first financial transaction.

3. The method of claim 2, wherein the step of executing, by the IFSS, the first financial transaction comprises sending instructions from the IFSS to the first financial institution.

4. The method of claim 1, further comprising the following steps:
- identifying, by the IFSS, financial transactions executed by the user and the conditions of the user's financial accounts when the user executed the financial transactions;
- identifying, by the IFSS, a first set of financial transactions executed by the user matched to a first set of conditions of the user's financial accounts;
- identifying, by the IFSS, when the user's financial accounts substantially match the first set of conditions of the user's financial accounts.

5. The method of claim 4, wherein the step of determining, by the IFSS, a first financial transaction for the user regarding the first financial account is also based upon the step of identifying, by the IFSS, when the user's financial accounts substantially match the first set of conditions of the user's financial accounts.

6. The method of claim 1, further comprising the step of:
- determining, by the IFSS, a second financial transaction for the user regarding another financial account of the user other than the first account based on the step of analyzing.

7. The method of claim 2, wherein said recommendation is provided by the IFSS to the user via one of a text message, email or a telephone call.

8. The method of claim 1, wherein said online banking system is an online bill payment service.

9. An integrated financial services system, comprising:
- a computer system having electronic access to a plurality of sources of financial data, said computer system being programmed to perform the following steps: accessing, by the computer system, first financial data regarding a first financial account of the user at a first financial institution, wherein the first financial account is a deposit account which allows money to be deposited and withdrawn by the user; accessing, by the computer system, at least one financial data selected from the group consisting of second financial data comprising financial data of the user as prepared by a personal financial management application, third financial data comprising financial data regarding a second financial account of the user, and fourth financial data comprising scheduled transactions of the user in an online banking system; analyzing, by the computer system, the first financial data together with at least one of the second financial data, third financial data and fourth financial data; and determining, by the computer system, a first financial transaction for the user regarding the first financial account based on the step of analyzing, the first financial transaction comprising a transfer of funds into the first financial account from a different financial account.

\* \* \* \* \*